(12) United States Patent
Chae

(10) Patent No.: US 8,289,476 B2
(45) Date of Patent: Oct. 16, 2012

(54) SUBSTRATE STRUCTURE OF LIQUID CRYSTAL DISPLAY AND FABRICATION METHOD THEREOF

(75) Inventor: Gee-Sung Chae, Inchon (KR)

(73) Assignee: LG Display Co., Ltd., Seoul (KR)

( * ) Notice: Subject to any disclaimer, the term of this patent is extended or adjusted under 35 U.S.C. 154(b) by 85 days.

(21) Appl. No.: 12/694,237

(22) Filed: Jan. 26, 2010

(65) Prior Publication Data

US 2010/0123857 A1 May 20, 2010

Related U.S. Application Data

(62) Division of application No. 11/234,132, filed on Sep. 26, 2005, now Pat. No. 7,675,586, which is a division of application No. 10/260,437, filed on Oct. 1, 2002, now Pat. No. 6,989,874.

(30) Foreign Application Priority Data

Dec. 29, 2001 (KR) .................................. 2001-88578

(51) Int. Cl.
*G02F 1/1335* (2006.01)

(52) U.S. Cl. ......................................................... 349/62
(58) Field of Classification Search .................... 349/95, 349/62, 57
See application file for complete search history.

(56) References Cited

U.S. PATENT DOCUMENTS

| 4,790,632 | A | | 12/1988 | Miyakawa et al. | |
|---|---|---|---|---|---|
| 5,101,279 | A | * | 3/1992 | Kurematsu et al. | 349/95 |
| 5,455,694 | A | * | 10/1995 | Ariki et al. | 349/95 |
| 5,473,453 | A | * | 12/1995 | Kurematsu | 349/110 |
| 5,666,176 | A | | 9/1997 | Kurematsu | |
| 6,323,920 | B1 | | 11/2001 | Kim | |
| 7,054,066 | B2 | | 5/2006 | Shimizu et al. | |

* cited by examiner

*Primary Examiner* — James Dudek
(74) *Attorney, Agent, or Firm* — Birch, Stewart, Kolasch & Birch, LLP

(57) ABSTRACT

In a substrate structure and a fabrication method thereof, light refracting members aligned with wirings or black matrix formed are integrally formed at a surface of a substrate. Light incident on the wirings or the black matrix can be refracted to a pixel region of the liquid crystal display panel. Accordingly, a flux of light being transmitted through the pixel region of the liquid crystal display panel can be improved significantly.

2 Claims, 11 Drawing Sheets

SUBSTRATE STRUCTURE OF LIQUID CRYSTAL DISPLAY AND FABRICATION METHOD THEREOF

This application claims priority under 35 U.S.C. §120 to and is a Divisional of application Ser. No. 11/234,132 filed Sep. 26, 2005 now U.S. Pat. No. 7,675,586, which is a Divisional of application Ser. No. 10/260,437 filed Oct. 1, 2002 (now U.S. Pat. No. 6,989,874). The entire contents of each of these applications are hereby incorporated by reference. The present application claims the benefit of Korean Patent Application No. 88578/2001 filed Dec. 29, 2001, under 35 U.S.C. §119, which is herein fully incorporated by reference.

BACKGROUND OF THE INVENTION

1. Field of the Invention

The present invention relates to a substrate structure of a liquid crystal display and a fabrication method thereof, and in particular to a substrate structure of a liquid crystal display and a fabrication method thereof that are capable of improving the light transmittance of the liquid crystal display.

2. Description of the Background Art

In general, liquid crystal display is for displaying pictures by adjusting the light transmittance of liquid crystal cells. Data signals according to picture information are supplied to the liquid crystal cells individually arranged in a matrix form.

The liquid crystal display includes a liquid crystal display panel having pixel unit liquid crystal cells in a matrix form and a driver IC (integrated circuit) for operating the liquid crystal cells. The liquid crystal display panel includes a color filter substrate and a TFT (thin film transistor) array substrate facing each other and a liquid crystal layer filled between them.

On the TFT array substrate of the liquid crystal display panel, parallel data lines for transmitting data signals from a data driver IC to the liquid crystal cells and parallel gate lines for transmitting scanning signals from a gate driver IC to the liquid crystal cells cross each other at about 90° angles. A liquid crystal cell is defined at each cross portion of the data line and the gate line.

The gate driver IC sequentially selects the liquid crystal cells arranged in matrix form by one line unit by applying scanning signals to the plural gate lines sequentially, and the selected one line of the liquid crystal cells receive data signals from the data driver IC.

In the meantime, the color filter substrate and the TFT array substrate facing each other include a common electrode and pixel electrodes in order to apply electric field to the liquid crystal layer. The pixel electrode is allocated to each liquid crystal cell formed on the TFT array substrate. On the other hand, the common electrode is formed onto the entire surface of the color filter substrate as one body. Accordingly, when a voltage is applied to the common electrode, by controlling a voltage applied to each of pixel electrodes, light transmittance of the liquid crystal cells can be individually controlled.

As described above, in order to control the voltage applied to the pixel electrode for each liquid crystal cell, a TFT used as a switching device is formed at each liquid crystal cell.

The construction parts of the liquid crystal display will be described in more detail with reference to accompanying drawings.

First, FIG. 1 is a plan view illustrating a unit pixel of a general liquid crystal display.

As depicted in FIG. 1, in the unit pixel of the general liquid crystal display, gate lines 4 are arranged in rows at regular intervals, and data lines 2 are arranged in columns at regular intervals. Accordingly, the gate lines 4 and the data lines 2 are arranged in the matrix format. Herein, each unit liquid crystal cell is defined at each cross portion of the data line 2 and the gate line 4 and includes a TFT and a pixel electrode 14.

For each TFT, a gate electrode 10 is formed by being extended from a certain portion of the gate line 4, a source electrode 8 is extended from the data line 2, and accordingly the gate electrode 10 overlaps with a certain portion of the source electrode 8. A drain electrode 12 is formed at a portion corresponding to the source electrode 8 on the basis of the gate electrode 10. The pixel electrode 14 electrically contacts the drain electrode 12 through a drain contact hole 16 formed through the drain electrode 12.

The TFT also includes a semiconductor layer (not shown) for forming a conductive channel between the source electrode 8 and the drain electrode 12 as a scanning signal is applied to the gate electrode 10 through the gate line 4.

As described above, because the TFT forms the conductive channel between the source electrode 8 and the drain electrode 12 by receiving the scanning signal from the gate line 4, a data signal supplied to the source electrode 8 through the data line 2 is transmitted to the drain electrode 12 through this conductive channel.

The pixel electrode 14 in electric contact with the drain electrode 12 through the drain contact hole 16 is made of transparent ITO (indium tin oxide) having high light transmittance ratio. Herein, the pixel electrode 14 generates electric field at the liquid crystal layer with a common transparent electrode (not shown) formed on the color filter substrate by the data signal supplied from the drain electrode 12.

As described above, when the electric field is applied to the liquid crystal layer, liquid crystal is rotated by dielectric anisotropy and transmits light generated from a back light unit to the color filter substrate through the pixel electrode 14, and a quantity of the transmitted light is adjusted by a voltage value of the data signal. Generally, the back light unit includes a light source and reflector for supplying light to the liquid crystal panel for displaying pictures, images, etc.

A storage electrode 20 in electric contact with the pixel electrode 14 through a storage contact hole 22 forms a storage capacitor 18 by being deposited on the gate line 4. A gate insulating layer (not shown) deposited in the process of forming of the TFT is inserted between the storage electrode 20 and the gate line 4.

The storage capacitor 18 charges a voltage value of a data signal for a turn-on period of the TFT in which the scanning signal is applied to the gate lines 4, and supplies the charged voltage to the pixel electrode 14 for a turn-off period of the TFT. Accordingly, the operation of the liquid crystal is maintained.

FIG. 2 is an exemplary view illustrating a section of a unit pixel cut along line I-I' in FIG. 1. As shown in FIG. 2, the unit pixel includes a color filter substrate 60 and a TFT array substrate 50 facing each other; a spacer 70 for separating the TFT array substrate 50 and the color filter substrate 60 from each other; and a liquid crystal layer 80 filled into the space between the TFT array substrate 50 and the color filter substrate 60.

The fabrication process of the TFT of the liquid crystal display will be described in detail with reference to FIG. 2.

First, the gate electrode 10 is formed by depositing a metal such as Mo, Al or Cr on the TFT array substrate 50 using a sputtering method and by patterning it through a first mask. A gate insulating layer 30 is then formed by depositing an insulating substance such as SiNx, etc. on the TFT array substrate 50 having the gate electrode 10. An active layer 36 of the TFT is formed by sequentially depositing a semiconductor layer 32 made of amorphous silicon and an ohmic contact layer 34 made of n+ amorphous silicon doped with impurities having high density on the gate insulating layer 30 and patterning them through a second mask.

The source electrode 8 and the drain electrode 12 of the TFT are then formed by depositing metal substance on the gate insulating layer 30 and the ohmic contact layer 34 and patterning it through a third mask. Herein, the patterning is performed so as to make the source electrode 8 and the drain electrode 12 separate from each other and face each other at the upper portion of the active layer 36. Accordingly, the ohmic contact layer 34 on the upper portion of the active layer 36 is exposed, and the exposed ohmic contact layer 34 is removed in patterning of the source electrode 8 and the drain electrode 12.

When the portion of the ohmic contact layer 34 is removed, a portion of the semiconductor layer 32 is exposed, and the exposed portion of the semiconductor layer 32 is defined as a channel region of the TFT.

A passivation film 38 made of SiNx is then deposited onto the gate insulating layer 30 on which the source electrode 8 and the drain electrode 12, etc. are formed with the exposed semiconductor layer 32. This can be done using a CVD (chemical vapor deposition) method. Herein, inorganic substance such as SiNx, etc. is used as a material of the passivation film 38. Recently, in order to improve the aperture ratio of the liquid crystal cell, organic substances having low dielectric constant such as BCB (benzocyclobutene), SOG (spin on glass) or acryl, etc. are used.

A drain contact hole 16 for exposing a part of the drain electrode 12 is then formed by selectively etching the passivation film 38 formed on the drain electrode 12 through a fourth mask.

Thereafter, a pixel electrode 14 is formed by sputtering a transparent electrode substance onto the passivation film 38 and patterning it through a fifth mask. Afterward, patterning is performed so as to make the pixel electrode 14 in contact with the drain electrode 12 through the drain contact hole 16.

Lastly, after forming an oriented film 51 on the TFT, a rubbing process is performed. A first polarizing plate 52 is also formed onto the TFT array substrate 50 opposite to the oriented film 51. Accordingly, the fabrication of the TFT array substrate 50 having the TFT is finished. Herein, the rubbing process means rubbing the surface of the oriented film 51 with a fabric at a uniform pressure and speed so as to arrange polymer chain on the surface of the oriented film 51 in a certain direction in order to determine an early oriented direction.

The fabrication process of the storage capacitor region will now be described in detail with reference to accompanying FIG. 2.

First, the gate insulating layer 30 is formed after patterning the gate line 4 on the TFT array substrate 50. The storage electrode 20 is then patterned on the gate insulating layer 30. Herein, the storage electrode 20 is formed during the patterning of the source electrode 8 and the drain electrode 12 of the TFT. The storage electrode 20 overlaps with a part of the gate line 4 with the gate insulating layer 30 formed between them and is operated as the storage capacitor 18.

The passivation film 38 is then formed on the gate insulating layer 30 on which the storage electrode 20 is formed, and the storage contact hole 22 for exposing a part of the storage electrode 20 is formed by etching a part of the passivation film 38. Herein, the storage contact hole 22 is formed as the drain contact hole 16 of the TFT is formed.

The pixel electrode 14 is then patterned on the passivation film 38, and the pixel electrode 14 is in contact with the storage electrode 20 through the storage contact hole 22. Herein, the pixel electrode 14 is formed in the patterning process of the pixel electrode 14 in the TFT region.

The fabrication process of the color filter substrate 60 having the color filter structure will now be described in detail with reference to FIG. 2.

First, a black matrix 62 is coated onto the color filter substrate 60 (e.g., glass substrate) at regular intervals. A red•green•blue color filter 63 is then formed onto the color filter substrate 60 on which the black matrix 62 is not coated. However, the color filter 63 is extended to certain regions of the black matrix 62.

A common electrode 64 is then formed by forming a metal substance onto the entire upper surface of the color filter 63 including the black matrix 62 and by patterning it. An oriented film 65 is then formed on the entire upper surface of the obtained body, and rubbing is performed. A second polarizing plate 66 is also formed on the opposite surface of the obtained body (color filter substrate 60) so as to correspond to the oriented film 65. Accordingly, the fabrication of the color filter substrate 60 having the color filter structure is finished.

When the fabrication of the TFT array region and the color filter region is finished as discussed above, a sealant (not shown) is printed onto the TFT array substrate 50, and the spacer 70 is dispersed on the color filter substrate 60. Herein, according to circumstances, the spacer 70 is dispersed on the TFT array substrate 50, and the sealant is printed onto the color filter substrate 60.

Afterward, the TFT array substrate 50 and the color filter substrate 60 having the above-described structures are adhered to each other. The adhered TFT array substrate 50 and the color filter substrate 60 are then cut into unit liquid crystal display panels. Herein, because plural liquid crystal display panels are simultaneously formed onto a glass substrate having a large area to improve a yield rate, a cutting process is required.

A liquid crystal layer 80 is formed at a space between the oriented film 51 of the TFT array substrate 50 and the oriented film 65 of the color filter substrate 60 by injecting liquid crystal into the cut liquid crystal display panel through an injecting hole. Thereafter, the injecting hole is sealed. Herein, in an early liquid crystal display fabrication process, after injecting the liquid crystal into the plural liquid crystal display panels, the liquid crystal display panels are cut into unit liquid crystal display panels. However, if the size of the unit liquid crystal display panel increases, uniform liquid crystal injection become more intricate and productivity is lowered due to liquid crystal injection errors. To address this problem, a method which injects liquid crystal after cutting is preferred.

Because the unit liquid crystal display panel has minute cell-gap having a μm size in several hundred mm² area, in order to inject the liquid crystal efficiently, a vacuum injection method using a pressure difference between the inside and outside of the unit liquid crystal display panel is generally used.

The light transmittance process of the liquid crystal display panel fabricated by the above-described process will now be described in more detail with reference to accompanying FIGS. 1 and 2.

First, a common electrode voltage is supplied to the common electrode 64 formed on the surface of the color filter substrate 60 as one body. And a scanning signal is sequentially supplied from the gate driver IC (not shown) formed on the TFT transistor array substrate 50 to the gate line 4. Accordingly, the liquid crystal cells arranged in the matrix form are sequentially selected by the gate line units.

The scanning signal supplied to the liquid crystal cells of the selected gate line 4 is applied to the gate electrode 10 of the TFT of each cell, and accordingly a conductive channel is formed between the source electrode 8 and the drain electrode 12.

In the meantime, a data signal is supplied from the data driver IC (not shown) to the liquid crystal cell of the selected gate line 4 through the selected data line 2, and the supplied data signal is applied to the source electrode 8 of the TFT. Accordingly, the data signal applied to the source electrode 8 of the TFT is supplied to the drain electrode 12 through the conductive channel for a scanning signal apply period. The data signal supplied to the drain electrode 12 of the TFT is supplied to the pixel electrode 14 in contact with the drain electrode 12 and operates the liquid crystal with the common electrode voltage supplied to the common electrode 64 of the color filter substrate 60.

Because the pixel electrode 14 contacts the storage electrode 20 through the storage contact hole 22, the data signal supplied to the pixel electrode 14 is supplied to the storage electrode 20 for the scanning signal apply period and is charged to the storage capacitor 18. The voltage charged in the storage capacitor 18 is then supplied to the pixel electrode 14 for the TFT turn-off period in which the scanning signal is not applied, and accordingly the operation of the liquid crystal is maintained.

As described above, by applying the common electrode voltage to the common electrode 64 formed on the surface of the color filter substrate 60 as one body and applying the voltage of the data signal to the pixel electrode 14 of the liquid crystal cells on the TFT array substrate 50 selected by the gate line units, the electric field is applied to the liquid crystal layer 80 between the common electrode 64 and the pixel electrode 14.

When the electric field is applied to the liquid crystal layer 80, the liquid crystal is rotated by dielectric anisotropy and transmits the light generated by the back light unit from the TFT array substrate 50 to the color filter substrate 60 through the pixel electrode 14, the liquid crystal layer 80 and the common electrode 64. Herein, according to an amplitude of the voltage of the data signal applied to the pixel electrode 14, strength/weakness of the electric field is adjusted, and the light transmittance of the liquid crystal layer 80 is adjusted by the strength/weakness of the electric field.

When the electric field in a certain direction is continually applied to the liquid crystal layer 80, however, the liquid crystal is deteriorated. Accordingly, in order to prevent the deterioration of the liquid crystal, the data signal voltage value is repeated as positive/negative as it is applied to the common electrode voltage. This is called a reverse operating method.

As described above, the liquid crystal display displays pictures by adjusting light transmittance, and the picture quality is affected by the light transmittance. Thus, a product having a good light transmittance can display bright and clear pictures.

FIG. 3 is an exemplary view illustrating the light transmittance of a general liquid crystal display panel.

FIG. 3 illustrates the TFT array substrate 50 and the color filter substrate 60 facing to each other; the liquid crystal layer 80 filled between the TFT array substrate 50 and the color filter substrate 60; and the wirings 53 and the black matrix 62 respectively patterned on the TFT array substrate 50 and the color filter substrate 60 so as to correspond to each other.

Accordingly, the light emitted from the back light unit (not shown) is transmitted through the pixel region of the liquid crystal display panel and displays a picture. However, because the light emitted from the back light unit is reflected at the region on the TFT array substrate 50 in which the wirings 53 are formed, light transmittance of the liquid crystal display panel is lowered. Thus, in the conventional liquid crystal display panel, light transmittance is not good. In order to solve this problem, a liquid crystal display panel for improving the light transmittance has been presented.

FIG. 4 is an exemplary view illustrating the light transmittance of a the liquid crystal display panel having improved light transmittance. In comparison with the conventional liquid crystal display panel in FIG. 3, it further includes a plurality of micro lenses 90 corresponding to gaps between the wirings.

The micro lens 90 is fabricated as a unit pixel shape, is aligned with gaps between the wirings 53 and is adhered to the TFT array substrate 50 so as not to face the color filter substrate 60. In more detail, the micro lenses 90 are adhered to the surface not having the wirings 53 and facing the back light unit.

The micro lens 90 refracts the light transmitted from the back light unit to the TFT array substrate 50 toward the pixel region of the liquid crystal display panel in order to improve a flux of light being transmitted through the pixel region of the liquid crystal display panel. However, in the fabrication of such a liquid crystal display panel including the micro lenses 90 between the wirings 53, by additionally fabricating the micro lenses 90 in a unit pixel shape, aligning each micro lens 90 and adhering it with the unit pixel of the liquid crystal display panel, the productivity of the liquid crystal display panel may be lowered, and accordingly a production cost may be increased.

In addition, because the micro lens 90 adhered to each unit pixel of the liquid crystal display panel increases the weight and thickness of the liquid crystal display panel, it is difficult to lower the weight of the liquid crystal display and slim down the liquid crystal display.

Further, because the light generated by the back light unit is transmitted through the micro lenses 90 in the pixel region of the liquid crystal display panel, a refractive index difference arises due to the different materials of the TFT array substrate 50 and the micro lenses 90, and as a result, light reflecting elements are generated. Accordingly, the light transmittance of the liquid crystal display is not remarkably improved in comparison with improvement of light usage efficiency.

SUMMARY OF THE INVENTION

In order to solve the above-mentioned problems and other problems, it is an object of the present invention to provide a substrate structure of a liquid crystal display and a fabrication method thereof that are capable of improving the light transmittance efficiency of a liquid crystal display panel.

It is another object of the present invention to provide a substrate structure of a liquid crystal display and a fabrication method thereof that are capable of not only reducing the weight of the light crystal panel and sliming down the liquid crystal display panel but also improving the light transmittance efficiency thereof.

In order to achieve the above-mentioned objects, a substrate structure of a liquid crystal display in accordance with an embodiment of the present invention includes a first substrate and a second substrate having a liquid crystal layer therebetween, at least one of a wiring and a black matrix formed on an internal surface of at least one of the first and second substrates, and at least one light refracting member formed on at least one of outer surfaces of the first and second substrates not facing the other substrate so as to correspond to the wiring or the black matrix.

A substrate structure usable in a display device according to an embodiment of the present invention includes a substrate including first and second surfaces, a light blocking member disposed on the second surface of the first substrate, and a light refracting member integrally disposed at the first surface of the substrate and being aligned with the light blocking member, such that light impinging on the first surface of the substrate from a light source is refracted through the first substrate away from the light blocking member.

A method for fabricating a substrate of a liquid crystal display according to an embodiment of the present invention includes forming first and second substrates having a liquid crystal layer therebetween, the first substrate having a wiring patterned thereon, the second substrate having a black matrix patterned thereon, and forming at least one light refracting member on at least one of outer surfaces of the first and second substrates not facing the other substrate so as to correspond to the wiring or the black matrix.

A method for fabricating a substrate of a liquid crystal display according to an embodiment of the present invention includes forming a light blocking member on a first surface of a substrate, forming a pattern of a photosensitive film that selectively exposes portions of a second surface of the substrate corresponding to the light blocking member, forming cylindrical grooves or wedge-shaped grooves by selectively removing the exposed portions of the second surface of the substrate through the pattern of the photosensitive film, and removing the pattern of the photosensitive film.

A method for fabricating a substrate of a liquid crystal display according to an embodiment of the present invention includes forming a light blocking member on a first surface of a substrate, forming a pattern of a photosensitive film that selectively masks portions of a second surface of the substrate corresponding to the light blocking member, forming cylindrical protrusions or wedge-shaped protrusions by selectively removing the second surface of the substrate using the pattern of the photosensitive film, and removing the pattern of the photosensitive film.

A method for fabricating a substrate usable in a display device according to an embodiment of the present invention includes providing a substrate including first and second surfaces, forming a light blocking member on the second surface of the substrate, and forming a light refracting member integrally at the first surface of the substrate and being aligned with the light blocking member, such that light impinging on the first surface of the substrate from a light source is refracted through the first surface away from the light blocking member.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

The preferred embodiments of the present invention will be described in detail with reference to accompanying drawings.

Figure 5:
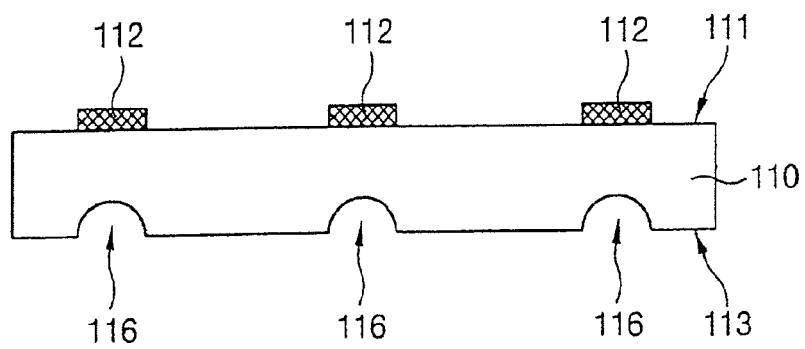
FIG. 5 is an exemplary view illustrating a substrate structure of a liquid crystal display in accordance with a first embodiment of the present invention.

FIG. 5 is an exemplary view illustrating a substrate structure of a liquid crystal display in accordance with a first embodiment of the present invention.

As depicted in FIG. 5, the substrate structure includes a substrate 110 having a flat first surface 111, a second surface 113, a light transmission region and a light cut-off region; wirings 112 patterned on the light cut-off region of the first surface 111 of the substrate 110; and cylindrical grooves 116 formed on the second surface 113 of the substrate 110 along the length direction of the wiring 112.

FIGS. 6A to 6F are exemplary views sequentially illustrating fabrication processes of the substrate structure of the liquid crystal display in accordance with the first embodiment of the present invention.

Figure 6A:
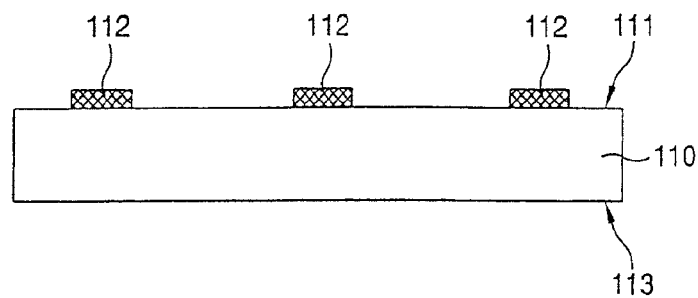
FIGS. 6A to 6F are exemplary views sequentially illustrating fabrication processes of the substrate structure of the liquid crystal display in accordance with the first embodiment of the present invention.

First, as depicted in FIG. 6A, the wirings 112 are patterned on the first surface 111 of the substrate 110. In this example, the substrate 110 is a TFT array substrate of a liquid crystal display, and the first surface 111 on which the wiring 112 is patterned faces a color filter substrate of the liquid crystal display.

Figure 1:
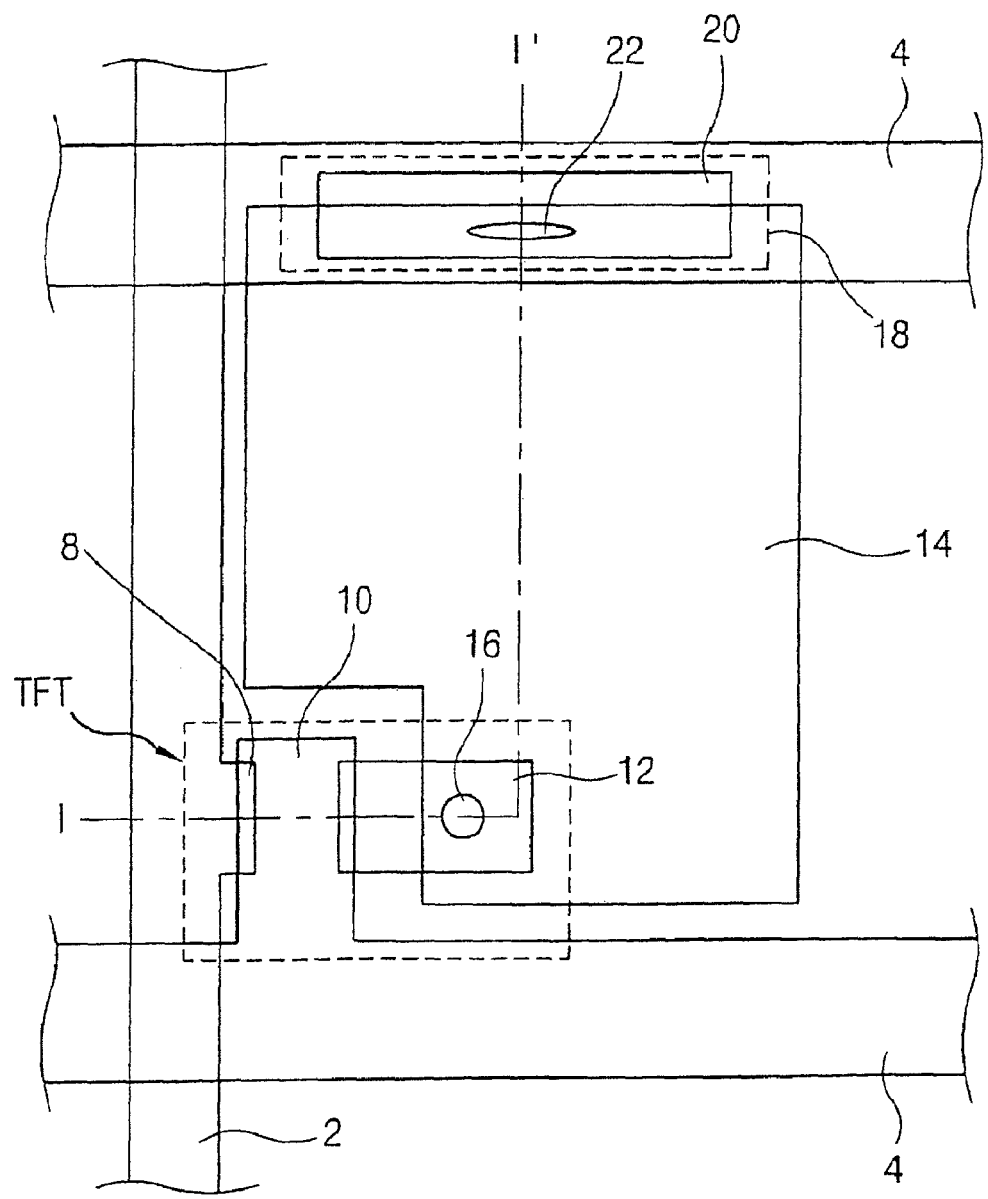
FIG. 1 is a plan view illustrating a unit pixel of a general liquid crystal display.
Figure 2:
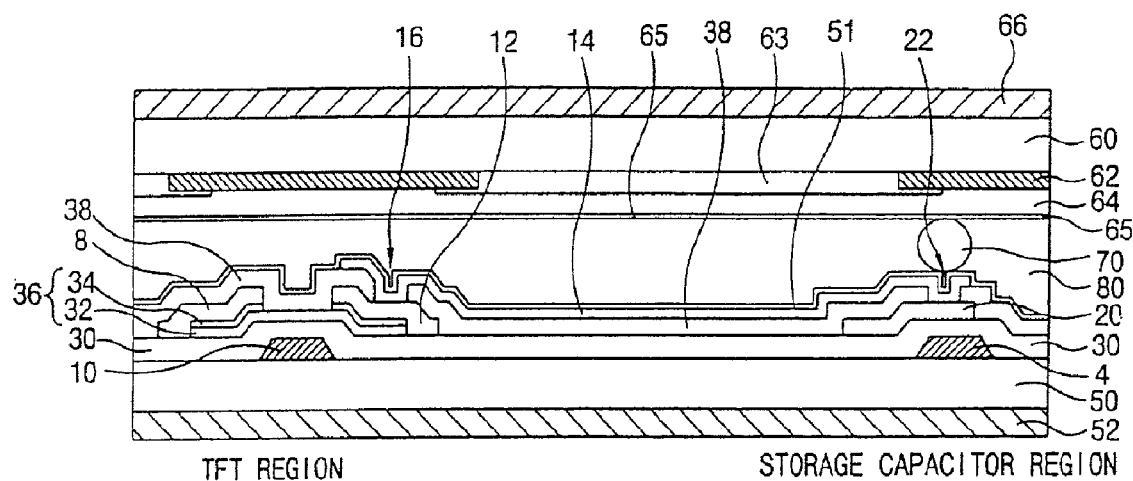
FIG. 2 is an exemplary view illustrating a section of the unit pixel cut along line I-I' in FIG. 1.
Figure 3:
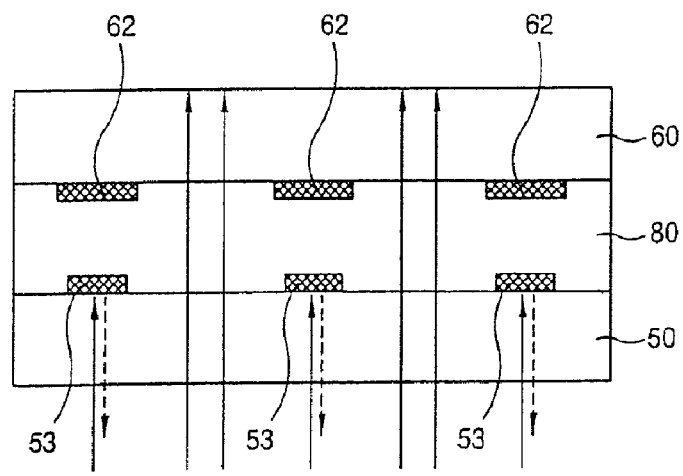
FIG. 3 is an exemplary view illustrating light transmission of a general liquid crystal display panel.
Figure 4:
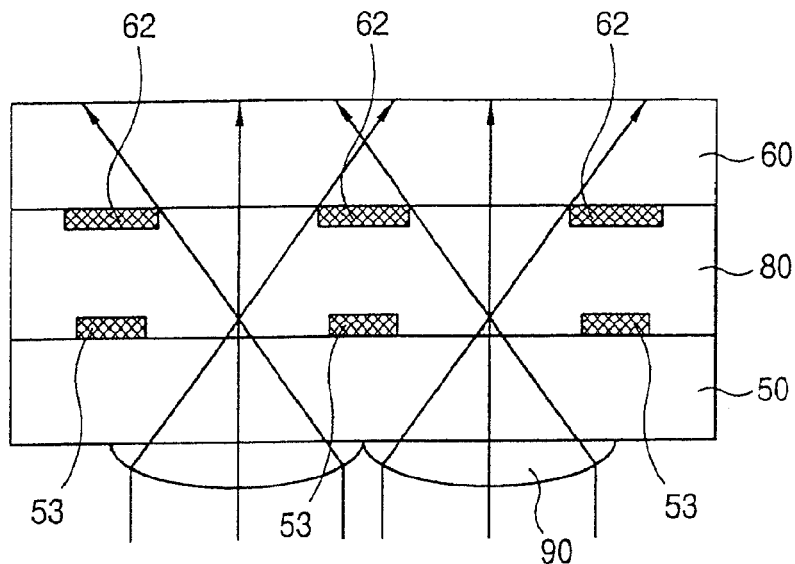
FIG. 4 is an exemplary view illustrating light transmission of a liquid crystal display panel having improved light transmittance.

Accordingly, with reference to FIG. 1, the wirings 112 patterned on the first surface 111 of the substrate 110 can be gate lines and/or data lines crossing each other. Unit pixels each having the TFT at each cross portion of the gate lines and the data lines are defined on the first surface 111 of the substrate 110.

Figure 6B:
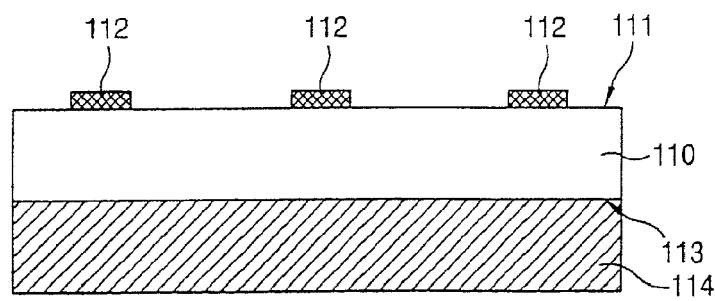

As depicted in FIG. 6B, a resist film 114 made of a photosensitive resin material is then coated onto the second surface 113 of the substrate 110. Herein, the second surface 113 of the substrate 110 does not face the color filter substrate of the liquid crystal display but faces a back light unit.

Figure 6C:
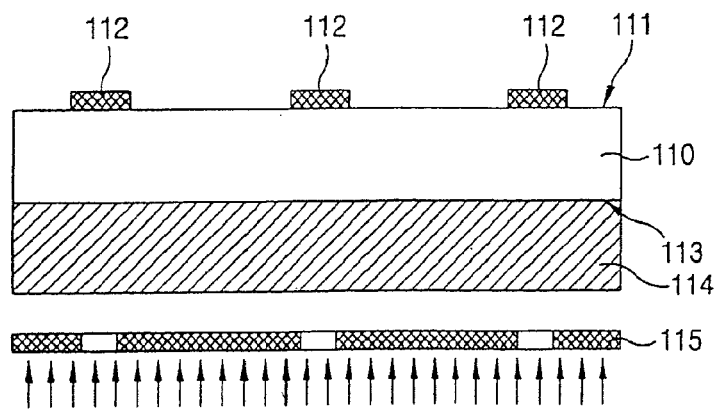

As depicted in FIG. 6C, an exposure process is then selectively performed on the resist film 114 through a mask 115 on which a light transmission region and a light cut-off region are patterned. Herein, by appropriately patterning the light transmission region and the light cut-off region, the exposure region of the resist film 114 is arranged along the wirings 112 patterned on the first surface 111 of the substrate 110. It is preferable for the exposure region to have a width narrower than the wirings 112.

In FIG. 6C, if a positive type resist film 114 is used in which a light irradiated region is eliminated by developing, the exposure process is performed through the mask 115 on which the light transmission region and the light cut-off region are appropriately patterned. However, if a negative type resist film 114 is used in which a light irradiated region remains by developing, the exposure process is performed through the mask 115 on which the light transmission region and the light cut-off region are conversely patterned.

Figure 6D:
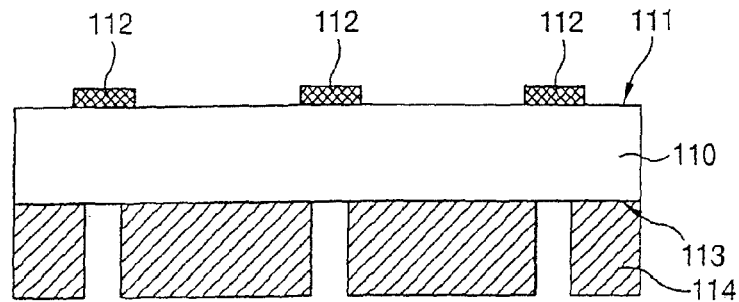

As depicted in FIG. 6D, by developing the resist film 114, the pattern of the resist film 114 which selectively exposes the second surface 113 of the substrate 110 is formed. Herein, the regions of the second surface 113 of the substrate 110 selectively exposed by the pattern of the resist film 114 are aligned with the wirings 112 patterned on the first surface 111. In one embodiment, each exposed region has a width narrower than that of the corresponding wiring 112.

Figure 6E:
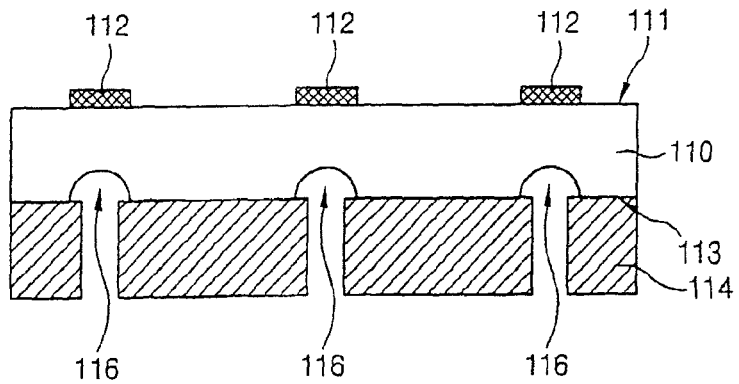

As depicted in FIG. 6E, by etching the exposed regions of the second surface 113, cylindrical grooves 116 are then formed so as to align with the wirings 112 patterned on the first surface 111. Herein, in order to perform an undercut etching of the lower portion of the resist film 114 at not only the exposed regions of the second surface 113 but also their surrounding around regions, a wet-etching is applied. And, it is preferable to adjust the etching condition appropriately. In one embodiment, the cylindrical grooves 116 formed at the second surface 113 of the substrate 110 have the same width as the wirings 112 patterned on the first surface 111 of the substrate 110.

Figure 6F:
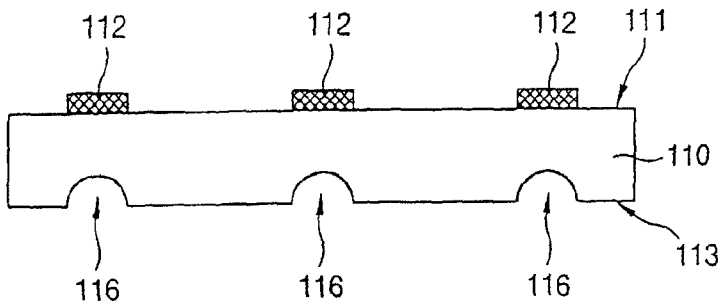

As depicted in FIG. 6F, the pattern of the remaining resist film 114 is then removed and the substrate 110 with the cylindrical grooves 116 is formed.

Figure 7:
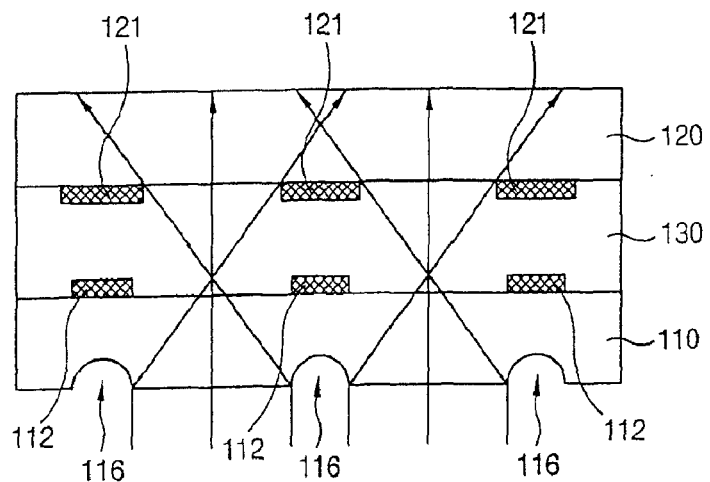
FIG. 7 is an exemplary view illustrating light transmission of the liquid crystal display panel using the substrate structure of FIG. 5 in accordance with the first embodiment of the present invention.

FIG. 7 is an exemplary view illustrating light transmission of the liquid crystal display panel using the substrate structure of FIG. 5 in accordance with the first embodiment of the present invention.

As depicted in FIG. 7, the substrate structure in accordance with the first embodiment of the present invention includes a first substrate 110 and a second substrate 120 adhered to each other so as to face each other and have a certain space between them; a liquid crystal layer 130 filled into the space between the first substrate 110 and the second substrate 120; wirings 112 and a black matrix 121 respectively patterned on each internal surface of the first substrate 110 and the second substrate 120 so as to face each other; and cylindrical grooves 116 formed at the outer surface or a surface on which the wirings 112 of the first substrate 110 are not formed, along the length direction of the wirings 112.

In this embodiment, the first and second substrates 110, 120 respectively represent the TFT array substrate and the color filter substrate facing and adhered to each other. The cylindrical grooves 116 are formed on the surface not facing the second substrate 120 of the first substrate 110 (namely, the surface facing the back light unit on which the wirings 112 are not formed) and extend along the length direction of the wirings 112 patterned on the surface facing the second substrate 120 of the first substrate 110 so that the cylindrical grooves 116 and the wirings 112 are aligned with each other. Accordingly, the cylindrical grooves 116 improve the flux of light being transmitted through the pixel region of the liquid crystal display panel by refracting the light incident from the back light unit onto the wirings 112 toward the pixel region of the liquid crystal display panel. Thus, the cylindrical grooves 116 function as light refracting members.

Furthermore, in the pixel region of the liquid crystal display panel, the cylindrical grooves 116 are defined at the substrate 110 itself and are integrated part of the substrate 110. Thus, unlike the conventional art, it is possible to prevent generation of reflecting elements due to a refractive index difference between the materials of the micro lenses and the substrate in the conventional device. Accordingly, the light transmittance of the liquid crystal display of the present invention is remarkably improved.

In addition, the cylindrical grooves 116 are formed at the surface not facing the second substrate 120 of the first substrate 110 (namely, the surface facing the back light unit on which the wirings 112 are not formed) by using the etching or other similar process. In comparison with the conventional device including the micro lenses, then it is possible to facilitate a fabrication process and remove weight/cost increase factors of the conventional liquid crystal display panel.

Figure 8:
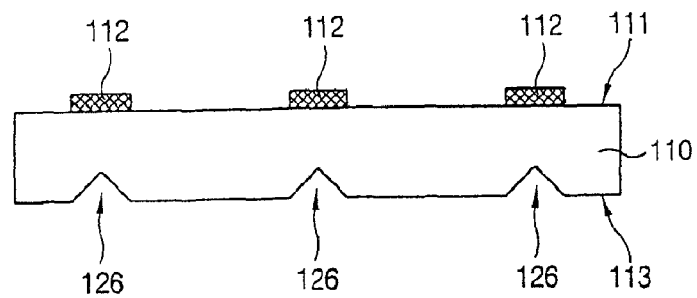
FIG. 8 is an exemplary view illustrating another substrate structure of a liquid crystal display in accordance with the first embodiment of the present invention.

FIG. 8 is an exemplary view illustrating another substrate structure of a liquid crystal display in accordance with the first embodiment of the present invention.

As depicted in FIG. 8, in comparison with FIG. 5, in substitute for the cylindrical grooves 116 formed on the second surface 113 of the substrate 110 along the length direction of the wirings 112, wedge-shaped grooves 126 are formed to extend along the length direction of the wirings 112 in alignment with the wirings 112.

The wedge-shaped grooves 126 can be formed by applying a dry-etching in the etching process in FIG. 6E and adjusting the etching condition as needed to obtain the wedge shape. The selection and use of a specific etching condition will vary depending on the desired dimensions of the wedge-shaped grooves 126, which is a technique appreciated by one skilled in the art. Similar to the cylindrical grooves 116, the wedge-shaped grooves 126 improve the flux of the light being transmitted through the pixel region of the liquid crystal display panel by refracting the light incident from the back light unit onto the wirings 112 patterned on the first substrate 110 toward the pixel region of the liquid crystal display panel.

Furthermore, in the pixel region of the liquid crystal display panel, the wedge-shaped grooves 126 are defined at the substrate 110 itself and are integrated part of the substrate 110. Thus, unlike the conventional art, it is possible to prevent generation of reflecting elements due to a refractive index difference between the materials of the micro lenses and the substrate in the conventional device. Accordingly, the light transmittance of the liquid crystal display of the present invention is remarkably improved.

In addition, the wedge-shaped grooves 126 are formed by etching the second surface 113 of the substrate 110. In comparison with the conventional device including the micro lenses, then it is possible to facilitate a fabrication process and remove weight/cost increase factors of the conventional liquid crystal display panel.

Figure 9:
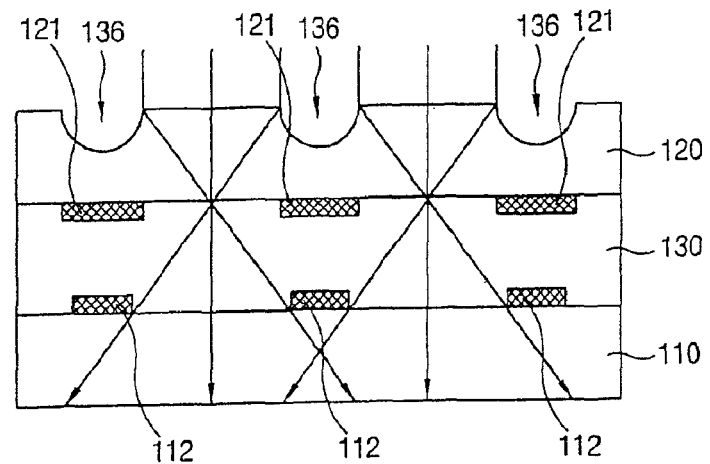
FIG. 9 is an exemplary view illustrating a substrate structure of a liquid crystal display in accordance with a second embodiment of the present invention.

FIG. 9 is an exemplary view illustrating a substrate structure of a liquid crystal display in accordance with a second embodiment of the present invention.

As depicted in FIG. 9, the substrate structure of the liquid crystal display in accordance with the second embodiment of the present invention includes a first substrate 110 and a second substrate 120 adhered to each other so as to face each other and having a certain space between them; a liquid crystal layer 130 filled into the space between the first substrate 110 and the second substrate 120; wirings 112 and a black matrix 121 respectively patterned on each internal surface of the first substrate 110 and the second substrate 120 so as to face each other; and cylindrical grooves 136 formed at the outer surface of the second substrate 120 on which the black matrix 121 is not formed so as to correspond to the black matrix 121.

In the substrate structure in FIG. 9, in comparison with the substrate structure of FIG. 7, the light from a light source such as the back light unit or ambient light impinges on the second substrate 120 first and then the first substrate 110. More specifically, the light emitted from the back light unit is sequentially transmitted through the second substrate 120, the liquid crystal layer 130 and the first substrate 110. In one embodiment, the width of the black matrix 121 formed on the second substrate 120 is wider than that of the wirings 112 patterned on the first substrate 110 in order to prevent the light reflected at the black matrix 121 from being transmitted to the wirings 112 when the light is incident, as depicted in FIG. 9.

Amorphous silicon formable at low temperature is generally used for the channel region of the TFT. However, when light is incident onto the amorphous silicon, leakage current is generated, and accordingly electric characteristics of the TFT may be changed. In order to prevent the change of the electric characteristics of the TFT, as depicted in FIG. 9, light is sequentially transmitted through the second substrate 120, the liquid crystal layer 130 and the first substrate 110.

Accordingly, in the second embodiment of the present invention, the cylindrical grooves 136 are formed at the surface of the second substrate 120 on which the black matrix 121 is not formed. The fabrication processes are the same as the fabrication processes depicted in FIGS. 6A to 6F, except for forming the cylindrical grooves 136 not on the first substrate 110 but on the second substrate 120.

The cylindrical grooves 136 formed at the surface of the second substrate 120 on which the black matrix 121 is not formed improve the flux of the light being transmitted through the pixel region of the liquid crystal display panel by refracting the light incident from the back light unit onto the black matrix 121 toward the pixel region of the liquid crystal display panel.

Furthermore, in the pixel region of the liquid crystal display panel, the cylindrical grooves 136 are defined at the second substrate 120 itself and are integrated part of the second substrate 120. Thus, unlike the conventional art, it is possible to prevent generation of reflecting elements due to a refractive index difference between the materials of the micro lenses and the substrate in the conventional device. Accordingly, the light transmittance of the liquid crystal display of the present invention is remarkably improved.

In addition, the cylindrical grooves 136 are formed by etching the surface facing the back light unit on which the black matrix 121 is not formed. In comparison with the conventional device including the micro lenses, then it is possible to facilitate a fabrication process and remove weight/cost increase factors of the conventional liquid crystal display panel.

Figure 10:
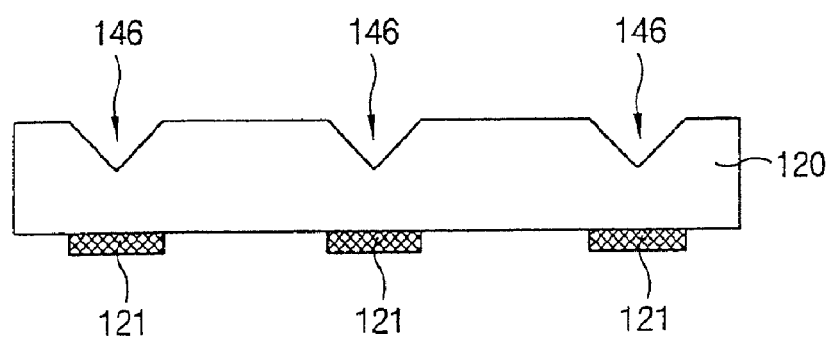
FIG. 10 is an exemplary view illustrating another substrate structure of a liquid crystal display in accordance with the second embodiment of the present invention.

FIG. 10 is an exemplary view illustrating another substrate structure of a liquid crystal display in accordance with the second embodiment of the present invention.

As depicted in FIG. 10, in comparison with FIG. 9, in substitute for the cylindrical grooves 136 formed on the surface of the second substrate 120 facing the back light unit, wedge-shaped grooves 146 are formed to correspond with the black matrix 121.

The wedge-shaped grooves 146 can be formed by applying the dry-etching or other suitable process in the etching process for forming the cylindrical grooves 136 in FIG. 9 and adjusting the etching condition appropriately, as same as the process of forming the cylindrical grooves 136 in FIG. 9. The wedge-shaped grooves 146 improve the flux of the light being transmitted through the pixel region of the liquid crystal display panel by refracting the light incident from the back light unit onto the black matrix 121 patterned on the second substrate 120 toward the pixel region of the liquid crystal display panel.

Furthermore, in the pixel region of the liquid crystal display panel, the wedge-shaped grooves 146 are defined at the second substrate 120 itself and are integrated part of the second substrate 120. Thus, unlike the conventional art, it is possible to prevent generation of reflecting elements due to a refractive index difference between the materials of the micro lenses and the substrate in the conventional device. Accordingly, the light transmittance of the liquid crystal display of the present invention is remarkably improved.

In addition, the wedge-shaped grooves 146 are formed by etching the surface of the second substrate 120 on which the black matrix 121 is not formed. In comparison with the conventional device including the micro lenses, then it is possible to facilitate a fabrication process and remove weight/cost increase factors of the conventional liquid crystal display panel.

Figure 11:
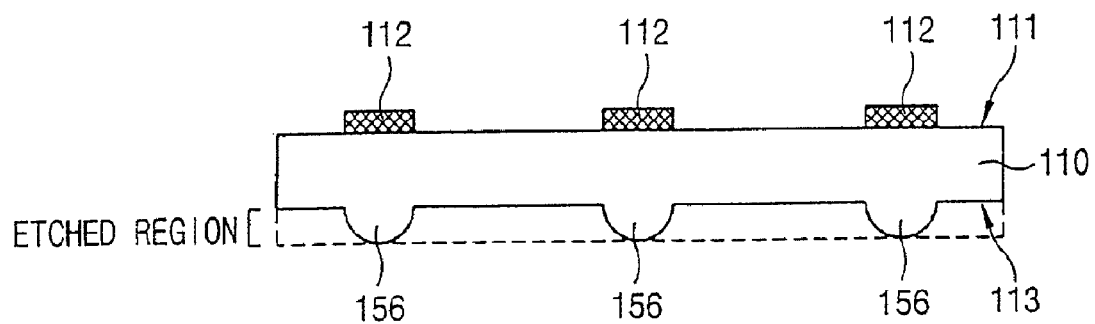
FIG. 11 is an exemplary view illustrating a substrate structure of a liquid crystal display in accordance with a third embodiment of the present invention.

FIG. 11 is an exemplary view illustrating a substrate structure of a liquid crystal display in accordance with a third embodiment of the present invention.

As depicted in FIG. 11, the substrate structure of the liquid crystal display in accordance with the third embodiment of the present invention includes a substrate 110 having a flat first surface 111, a second surface 113, a light transmission region and a light cut-off region; wirings 112 patterned on the light cut-off region of the first surface 111 of the substrate 110; and cylindrical protrusions 156 formed on the second surface 113 of the substrate 110 and extending along the length direction of the wirings 112.

FIGS. 12A to 12F are exemplary views sequentially illustrating fabrication processes of the substrate structure of FIG. 11 in accordance with the third embodiment of the present invention.

Figure 12A:
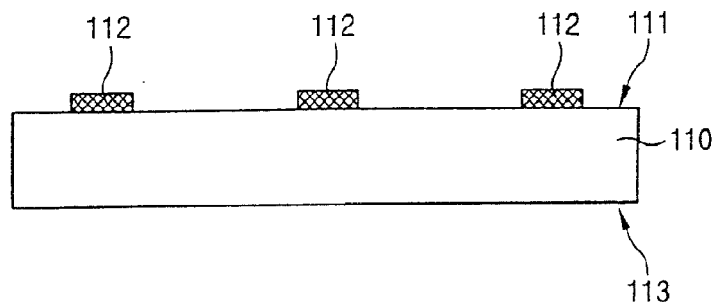
FIGS. 12A to 12F are exemplary views sequentially illustrating fabrication processes of the substrate structure of the liquid crystal display in accordance with the third embodiment of the present invention.

First, as depicted in FIG. 12A, the wirings 112 are patterned on the first surface 111 of the substrate 110. In this example, the substrate 110 is a TFT array substrate of the liquid crystal display, and the first surface 111 on which the wirings 112 are patterned faces a color filter substrate of the liquid crystal display.

Accordingly, with reference to FIG. 1, the wirings 112 patterned on the first surface 111 of the substrate 110 are the gate lines and the data lines crossing each other. The unit pixels having the TFT at each cross portion of the gate lines and the data lines are defined on the first surface 111 of the substrate 110.

Figure 12B:
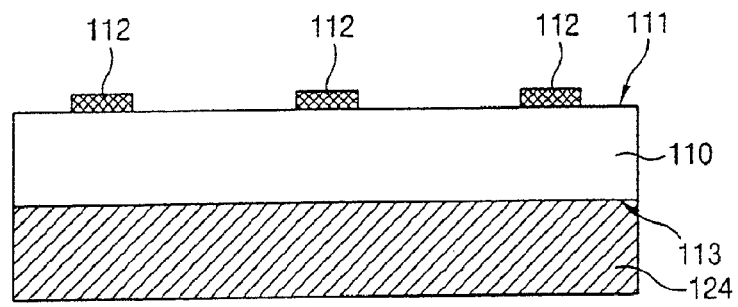

As depicted in FIG. 12B, a resist film 124 made of a photosensitive resin material is then coated onto the second surface 113 of the substrate 110. Herein, the second surface 113 of the substrate 110 does not face the color filter substrate of the liquid crystal display but faces the back light unit.

Figure 12C:
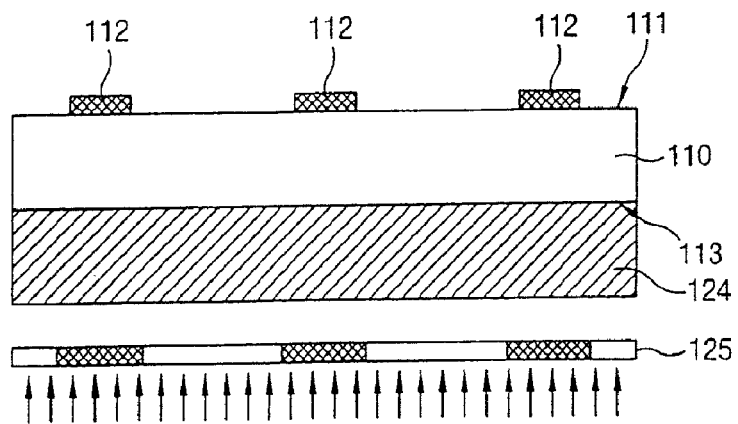

As depicted in FIG. 12C, an exposure process is selectively performed onto the resist film 124 through a mask 125 on which a light transmission region and a light cut-off region are patterned. Herein, by appropriately patterning the light transmission region and the light cut-off region on the mask 125, the exposure region of the resist film 124 extends along the wirings 112 patterned on the first surface 111 of the substrate 110. In one embodiment, it is preferable for the exposure region to have a width greater than that of the wirings 112.

In FIG. 12C, if a positive type resist film 124 is used in which a light irradiated region is eliminated by development, an exposure process is performed through the mask 125 on which the light transmission region and the light cut-off region are appropriately patterned. However, if a negative type resist film 124 is used in which a light irradiated region remains by development, the exposure process is performed through the mask 125 on which the light transmission region and the light cut-off region are conversely patterned.

Figure 12D:
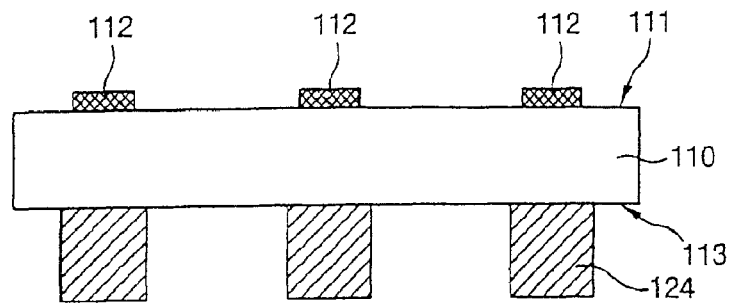

As depicted in FIG. 12D, by developing the resist film 124, the pattern of the resist film 124 which selectively exposes the second surface 113 of the substrate 110 is formed. The pattern of the remaining resist film 124 corresponds to the wirings 112. Herein, the regions of the second surface 113 of the substrate 110 selectively exposed by the pattern of the resist film 124 are arranged to correspond with regions around the wirings 112 patterned on the first surface 111. In one embodiment, the exposed regions have a width greater than that of the wirings 112.

Figure 12E:
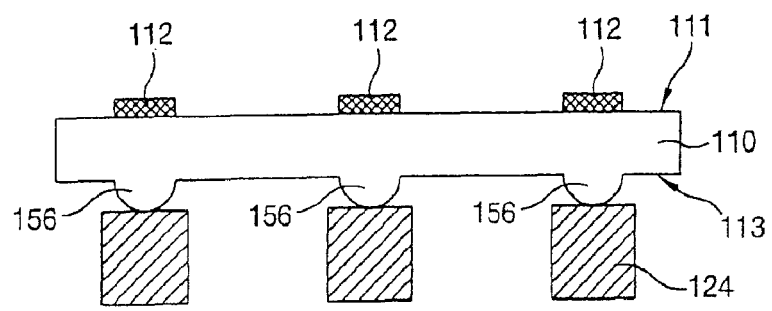

As depicted in FIG. 12E, by etching the exposed regions of the second surface 113 by using the pattern of the resist film 124, the cylindrical protrusions 156 are formed so as to align with the wirings 112 patterned on the first surface 111. Herein, in order to perform an undercut etching of the lower portion of the resist film 124 at not only the exposed regions of the second surface 113 but also their surrounding regions, it is preferable to adjust the etching conditions appropriately. Accordingly, the cylindrical protrusions 156 formed at the second surface 113 of the substrate 110 have the same width as the wirings 112 patterned on the first surface 111 of the substrate 110.

Figure 12F:
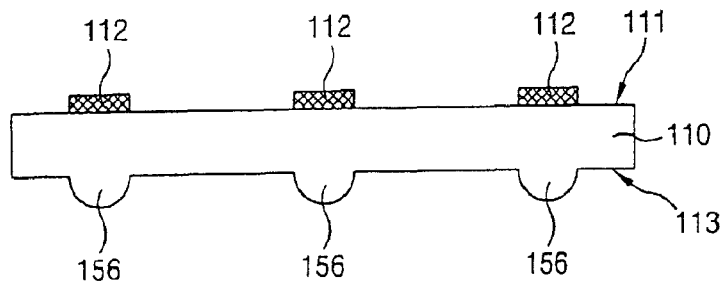

As depicted in FIG. 12F, the pattern of the remained resist film 124 is then eliminated and the substrate 110 with the cylindrical protrusions 156 is formed.

Figure 13:
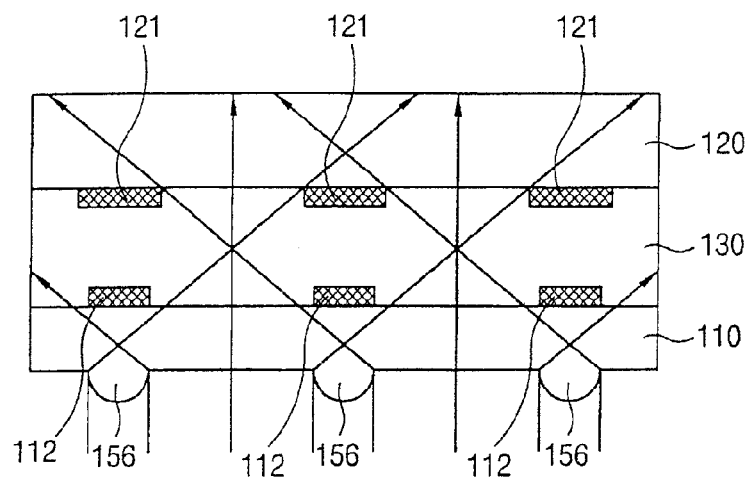
FIG. 13 is an exemplary view illustrating light transmission of the liquid crystal display panel using the substrate structure of FIG. 11 in accordance with the third embodiment of the present invention.

FIG. 13 is an exemplary view illustrating light transmission of the liquid crystal display panel using the substrate structure of FIG. 11 in accordance with the third embodiment of the present invention.

As depicted in FIG. 13, another substrate structure of the liquid crystal display in accordance with the third embodiment of the present invention includes a substrate 110 having a flat first surface 111, a second surface 113, a light transmission region and a light cut-off region; wirings 112 and a black matrix 121 respectively patterned on each internal surface of the first substrate 110 and the second substrate 120 so as to face each other; and cylindrical protrusions 156 formed on the outer surface of the first surface 110 on which the wirings 112 are not formed.

In this example, the first and second substrates 110, 120 respectively represent the TFT array substrate and the color filter substrate facing and adhered to each other in a liquid crystal display panel.

The cylindrical protrusions 156 are formed on the surface of the first substrate 110 not facing the second substrate 120 (namely, the surface facing the back light unit) and extend along the length direction of the wirings 112 patterned on the surface of the first substrate 110 facing the second substrate 120.

Accordingly, the cylindrical protrusions 156 can improve the flux of light being transmitted through the pixel region of the liquid crystal display panel by refracting the light incident from the back light unit onto the wirings 112 patterned on the first substrate 110 toward the pixel region of the liquid crystal display panel.

Furthermore, in the pixel region of the liquid crystal display panel, the cylindrical grooves 156 are defined at the substrate 110 itself and are integrated part of the substrate 110. Thus, unlike the conventional art, it is possible to prevent generation of reflecting elements due to a refractive index difference between the materials of the micro lenses and the substrate in the conventional device. Accordingly, the light transmittance of the liquid crystal display of the present invention is remarkably improved.

In addition, the cylindrical protrusions 156 are formed at the surface of the first substrate 110 not facing the second substrate 120 (namely, the surface facing the back light unit on which the wirings 112 are not formed) by the etching or similar process. In comparison with the conventional device including the micro lenses, then it is possible to facilitate a fabrication process and remove weight/cost increase factors of the conventional liquid crystal display panel.

Particularly, in the third embodiment of the present invention, by selectively removing portions of the substrate 110 around the cylindrical protrusions 156 and maintaining the cylindrical protrusions 156, the weight of the liquid crystal display panel can be further reduced in comparison with the first and second embodiments of the present invention.

That is, in the first and second embodiments of the present invention, by forming grooves by etching a selected region from the surface of a substrate, the etched region is not large. However, in the third embodiment of the present invention, by forming protrusions by keeping only selected regions while generally etching out the surface of the substrate, the liquid crystal display panel's weight can be remarkably reduced.

Figure 14:
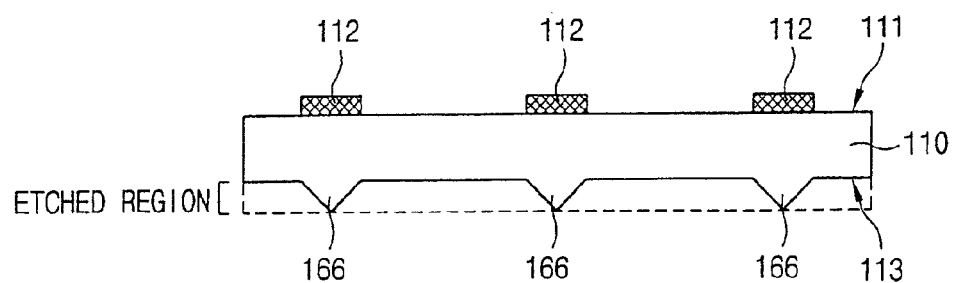
FIG. 14 is an exemplary view illustrating another substrate structure of a liquid crystal display in accordance with the third embodiment of the present invention.

FIG. 14 is an exemplary view illustrating another substrate structure of a liquid crystal display in accordance with the third embodiment of the present invention.

As depicted in FIG. 14, in comparison with FIG. 11, in substitute for the cylindrical protrusions 156 formed on the second surface 113 of the substrate 110 along the length direction of the wiring 112, wedge-shaped protrusions 166 are formed to extend along the length direction of the wirings 112.

The wedge-shaped protrusions 166 can be formed by adjusting the etching condition in the etching process in FIG. 12E appropriately, as same as the cylindrical protrusions 156 in FIG. 13. The wedge-shaped protrusions 166 improve the flux of the light being transmitted through the pixel region of the liquid crystal display panel by refracting the light incident from the back light unit onto the wiring 112 patterned on the first substrate 110 toward the pixel region of the liquid crystal display panel.

Furthermore, in the pixel region of the liquid crystal display panel, the wedge-shaped protrusions 166 are defined at the first substrate 110 itself and are integrated part of the first substrate 110. Thus, unlike the conventional art, it is possible to prevent generation of reflecting elements due to a refractive index difference between the materials of the micro lenses and the substrate in the conventional device. Accordingly, the light transmittance of the liquid crystal display of the present invention is remarkably improved.

In addition, the wedge-shaped protrusions 166 are formed by etching the second surface 113 of the first substrate 110. In comparison with the conventional device including the micro lenses, then it is possible to facilitate a fabrication process and remove weight/cost increase factors of the conventional liquid crystal display panel.

Particularly, similar to the formation of the cylindrical protrusions 156 in FIG. 13, the wedge-shaped protrusions 166 are formed by removing the portions of the substrate 110 around the wedge-shaped protrusions 166 and maintaining the wedge-shaped protrusions 166. In comparison with the first and second embodiments of the present invention, then the weight of the liquid crystal display panel can be further reduced.

Figure 15:
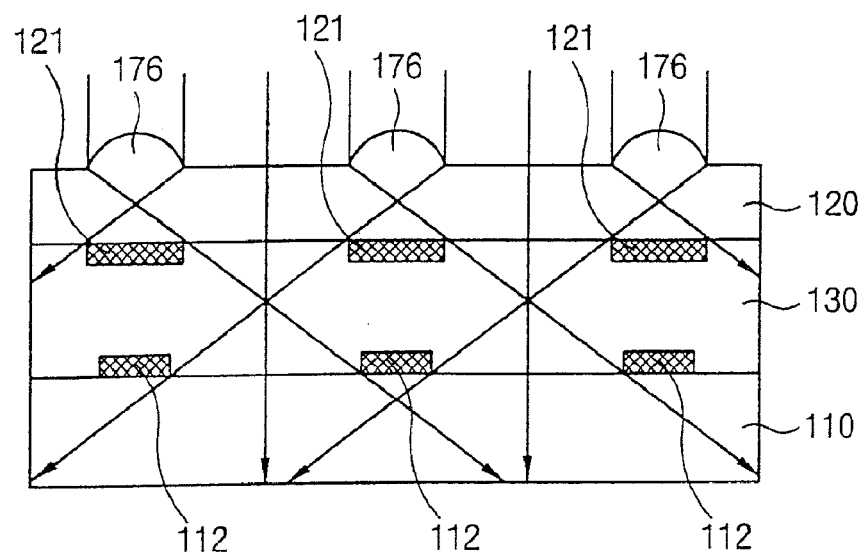
FIG. 15 is an exemplary view illustrating a substrate structure of a liquid crystal display in accordance with a fourth embodiment of the present invention.

FIG. 15 is an exemplary view illustrating a substrate structure of a liquid crystal display in accordance with a fourth embodiment of the present invention.

As depicted in FIG. 15, the substrate structure of the liquid crystal display in accordance with the fourth embodiment of the present invention includes a substrate 110 having two flat first surfaces, a light transmission region and a light cut-off region; wirings 112 and the black matrix 121 respectively patterned on the internal surface of the first substrate 110 and the second substrate 120 so as to face each other; and cylindrical protrusions 176 formed on the outer surface of the second substrate 120 on which the black matrix 121 is not formed. The cylindrical protrusions 176 extend along the black matrix 121.

In the substrate structure of the liquid crystal display in FIG. 15, in comparison with FIG. 13, light emitted from the back light unit impinges on the second substrate 120 first and then sequentially transmitted through the liquid crystal layer 130 and the first substrate 110 as in FIG. 9. Since this is already described in detail with reference to FIG. 9, the explanation will be abridged.

In the fourth embodiment of the present invention, the cylindrical protrusions 176 are formed at the surface of the second substrate 120 on which the black matrix 121 is not formed. The fabrication process of the cylindrical protrusions 176 on the second substrate 120 is the same as the fabrication process of the cylindrical protrusions 156 as illustrated in FIGS. 12A to 12F, except for forming the cylindrical protrusions 176 not on the first substrate 110 but on the second substrate 120.

The cylindrical protrusions 176 formed on the second substrate 120 on which the black matrix 121 is not formed improve the flux of light being transmitted through the pixel region of the liquid crystal display panel by refracting the light incident from the back light unit onto the black matrix 121 patterned on the second substrate 120 toward the pixel region of the liquid crystal display panel.

Furthermore, in the pixel region of the liquid crystal display panel, the cylindrical protrusions 176 are defined at the second substrate 120 itself and are integrated part of the second substrate 120. Thus, unlike the conventional art, it is possible to prevent generation of reflecting elements due to a refractive index difference between the materials of the micro lenses and the substrate in the conventional device. Accordingly, the light transmittance of the liquid crystal display of the present invention is remarkably improved.

In addition, the cylindrical protrusions 176 are formed at the surface of the second substrate 120 not facing the first substrate 110 (namely, the surface facing the back light unit on which the black matrix 121 is not formed) by the etching or other suitable process. In comparison with the conventional device including the micro lenses, then it is possible to facilitate a fabrication process and remove weight/cost increase factors of the conventional liquid crystal display panel.

Particularly, in the fourth embodiment of the present invention, in the same manner as the cylindrical protrusions 156 and the wedge-shaped protrusions 166 formed on the first substrate 110 in accordance with the third embodiment of the present invention, by selectively remaining the cylindrical protrusions 176 while generally etching away the portions of the substrate 120 around the protrusions 176, the weight of the liquid crystal display panel can be further reduced in comparison with the first and second embodiments of the present invention.

Figure 16:
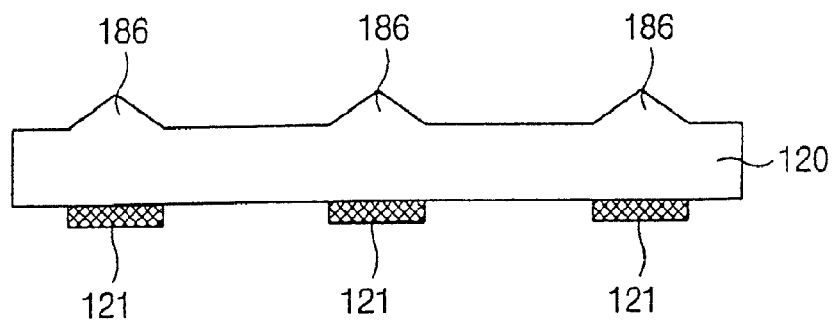
FIG. 16 is an exemplary view illustrating another substrate structure of a liquid crystal display in accordance with the fourth embodiment of the present invention.

FIG. 16 is an exemplary view illustrating another substrate structure of a liquid crystal display in accordance with the fourth embodiment of the present invention.

As depicted in FIG. 16, in comparison with FIG. 15, in substitute for the cylindrical protrusions 176 formed on the surface of the second substrate 120 on which the black matrix 121 is not formed, wedge-shaped protrusions 186 are formed on the second substrate 120 to correspond with the black matrix 121.

The wedge-shaped protrusions 186 can be formed by adjusting the etching condition in the etching process in FIG. 15 appropriately, as same as the cylindrical protrusions 176 in FIG. 15. The wedge-shaped protrusions 186, improve the flux of the light being transmitted through the pixel region of the liquid crystal display panel by refracting the light incident from the back light unit onto the black matrix 121 patterned on the second substrate 120 toward the pixel region of the liquid crystal display panel.

Furthermore, in the pixel region of the liquid crystal display panel, the wedge-shaped protrusions 186 are defined at the second substrate 120 itself and are integrated part of the second substrate 120. Thus, unlike the conventional art, it is possible to prevent generation of reflecting elements due to a refractive index difference between the materials of the micro lenses and the substrate in the conventional device. Accordingly, the light transmittance of the liquid crystal display of the present invention is remarkably improved.

In addition, the wedge-shaped protrusions 186 are formed by etching the surface of the second substrate 120 on which the black matrix 121 is not formed. In comparison with the conventional device including the micro lenses, then it is possible to facilitate a fabrication process and remove weight/cost increase factors of the conventional liquid crystal display panel.

Particularly, in the same manner as the cylindrical protrusions 176 in FIG. 15, in the wedge-shaped protrusions 186 shown in FIG. 16, by selectively remaining the wedge-shaped protrusions 186 while generally etching out the portions of the second substrate 120 around the protrusions 186, the weight of the liquid crystal display panel can further be reduced compared to the first and second embodiments of the present invention.

In the embodiments of the present invention, light refracting means (e.g., the cylindrical or wedge-shaped grooves or protrusions) aligned with the wirings or black matrix on the substrate can be fabricated as below.

In one method, by considering in advance the position at which the wiring or the black matrix is to be formed on the substrate, the light refracting means of the present invention can be formed first. Afterward, the wiring or the black matrix can be formed.

In another method, after forming the wiring or the black matrix on the substrate, the light refracting means can be formed so as to align with the wiring or the black matrix.

In still another method, after adhering the first substrate having the wirings to the second substrate having the black matrix, the light refracting means of the present invention can be formed on the outer surface of the first substrate or the second substrate so as to correspond to the wirings or the black matrix.

In the cylindrical grooves and the cylindrical protrusions in accordance with the embodiments of the present invention, the more the depth/length of the grooves/protrusions increases from the surface of the substrate, the more the quantity of light refracted to the picture region of the liquid crystal display panel is increased.

In more detail, the cylindrical grooves and the cylindrical protrusions are assumed as semicircular lenses. A radius of the lenses corresponds to one-half of the line width (L), and a gain variation quantity of actual light ($\Delta$ Pg) can be calculated according to the following Equation 1.

$$\Delta Pg = \frac{\left(3.14 \times \frac{L}{2}\right) - L}{L} = 0.57 \qquad \text{[Equation 1]}$$

Accordingly, in one example, assume that the light transmittance of the liquid crystal display without the light refracting members of the present invention is 30% with 70% of light loss quantity. Then the light transmittance pertaining to the light refracting members of the present invention can be calculated as about 25% according to the following Equation 2.

$$\frac{70\%}{1.57} \times 0.57 = 25\% \qquad \text{[Equation 2]}$$

Then, the total light transmittance of the liquid crystal display having the light refracting members according to the present invention is 30%+25%=55%. In other words, by providing the light refracting members of the present invention, the light transmittance of a liquid crystal display can be increased from 30% to 55% according to this one example.

In the meantime, in order to make light incident on the wirings or the black matrix refract and pass through the effective pixels of the liquid crystal display panel, a radius curvature or depth, etc. of protrusions or grooves has to be considered appropriately in the process of forming the cylindrical grooves, cylindrical protrusions, wedge-shaped grooves and the wedge-shaped protrusions.

The above-described embodiments can be applied to not only a general transmission type liquid crystal display but also a projection type display or additional transmittance type display. They may also apply to other display types such as reflective LCDs or transflective LCDs. Further, the present invention is not limited to the specific protrusions or grooves described herein, but covers protrusions or grooves having other shapes, but corresponding to the black matrix, wirings or any other light blocking elements. For example, protrusions or grooves having a combination of circular and wedge structures such as wedge-shaped structures with rounded tips may be used as long as the structure refracts light away from the black matrix, wirings or the like. Moreover, it may be possible to provide a mixture of protrusions and grooves discussed herein along one surface of the substrate. For example, the cylindrical grooves 116 and the wedge-shaped grooves 126 may be alternatively positioned along the surface 113 of the substrate.

In the above-described substrate structure and the fabrication method thereof in accordance with the embodiments of the present invention, by including one or more light refracting members aligned with the wirings and/or the black matrix formed on the substrate, light incident onto the wirings or the black matrix can be refracted to the pixel region of the liquid crystal display panel. Accordingly, the flux of light being transmitted through the pixel region of the liquid crystal display panel can be improved significantly.

Furthermore, in the pixel region of the liquid crystal display panel, since the light refracting members are integrated into the substrate itself, unlike the conventional art, it is possible to prevent generation of reflecting elements which occurs in the conventional devices due to a refractive index difference between the materials of the micro lenses and the substrate. Accordingly, the light transmittance of the liquid crystal display of the present invention is remarkably improved.

In addition, the light refracting members are formed by etching the surface of the substrate itself. That is, the light refracting members are integrated into the substrate of the liquid crystal display. In comparison with the conventional device including micro lenses separately adhered to the substrate, then it is possible to facilitate a fabrication process and remove weight/cost increase factors of the conventional liquid crystal display panel.

Moreover, in the light refracting members in accordance with the third and fourth embodiments of the present invention, by selectively remaining the light refracting members while generally etching out the surface portion of the substrate around the light refracting members, the weight of the liquid crystal display panel can be further reduced significantly compared to the first and second embodiments of the present invention.

Accordingly, in the embodiments of the present invention, it is possible to fabricate a liquid crystal display panel capable of improving light transmittance without increasing power consumption and heat generation quantity of a back light unit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A substrate structure usable in a display device, comprising:
    a first substrate and a second substrate having a liquid crystal layer therebetween;
    a light blocking member formed on an internal surface of at least one of the first and second substrates; and
    a light refracting member formed on at least one of outer surfaces of the first and second substrates not facing the other substrate so as to correspond to the light blocking member, such that light impinging on the at least one of outer surfaces of the first and second substrates from a light source is refracted through the at least one of outer surfaces away from the light blocking member, wherein the light refracting member includes at least one of a wedge-shaped groove, a wedge-shaped protrusion, a cylindrical groove and a cylindrical protrusion, wherein the light refracting member extends in a length direction of the light blocking member and is overlapped with the light blocking member, and wherein the light incident from a back light unit onto the light blocking member towards a pixel region of a liquid crystal display panel is refracted by the light refracting member, and in the pixel region of the liquid crystal display panel, the light incident from the back light unit is not transmitted into the light refracting member but is transmitted into the first substrate.

2. The structure of claim 1, wherein the light blocking member is a black matrix or a wiring of a liquid crystal display.

* * * * *